Feb. 19, 1957
W. R. SPROWLS
2,782,214
OXIDATIVE ALKALINE FUSION OF SULFUR-CONTAINING ORGANIC COMPOUNDS
Filed Dec. 30, 1952
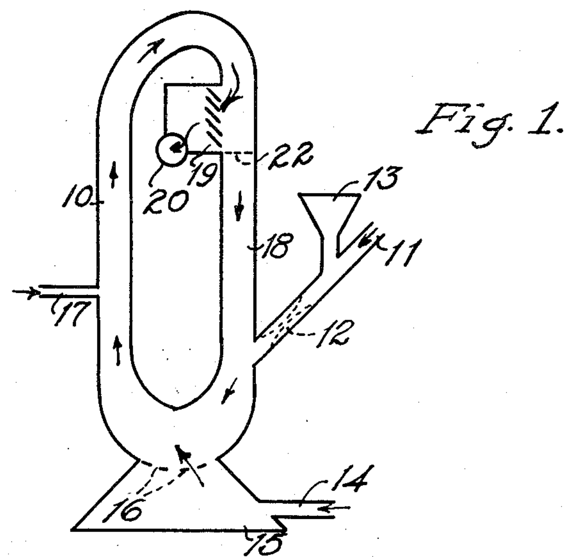
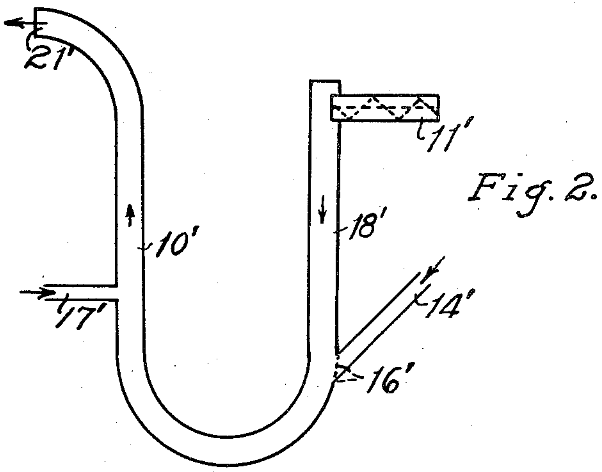
INVENTOR.
WILLARD R. SPROWLS
BY Darby + Darby United States Patent Office 2,782,214

Patented Feb. 19, 1957

2,782,214

OXIDATIVE ALKALINE FUSION OF SULFUR-CONTAINING ORGANIC COMPOUNDS

Willard R. Sprowls, New York, N. Y., assignor to The Baker Castor Oil Company, New York, N. Y., a corporation of New Jersey Application December 30, 1952, Serial No. 328,719

7 Claims. (Cl. 260—413)

Reactions involving the oxidation of organic compounds by alkali fusion are known in the art. The conventional processes are cumbersome, and many of the process steps are effected only with difficulty. In general, the prior art processes show low yields, and are of the batch process type.

It is an object of this invention to treat sulfur-containing organic compounds by an improved, oxidative alkali fusion process. It is a further object to carry out such reactions in a simple manner, at a rapid rate, and in a continuous operation. Other objects will be apparent from the following description of the invention.

According to the instant invention, sulfur-containing organic compounds and strong bases are reacted in finely divided form in an enclosure at elevated temperatures. A feature of this process is that the reaction mixture may desirably be suspended in the reaction enclosure by means of an elastic fluid. The products obtained are carboxylic acids having the same number of carbon atoms as the sulfur-containing reactant. This is a desirable and economical method of obtaining such acids, especially since the sulfur compounds are available as by-products of petroleum refinery operations or are readily obtained by known methods from olefinic compounds and the like.

According to one embodiment of this invention, the sulfur-containing organic compound to be oxidized is intimately mixed with a stoichiometric excess of the alkali to be used for the fusion reaction. Such a mixture would be prepared only when both reactants are in the solid or in the liquid state, e. g., through being molten. When this mixture is in the solid rather than in the liquid state, it is preferred that its particle size not exceed about ten microns. Following the preparation of this mixture, it is charged, in the form of a fine cloud or mist, into an enclosure which is maintained at an elevated temperature and at substantially atmospheric pressure. Simultaneously with the introduction of the charge, an elastic fluid may be introduced into the enclosure, for the purpose of acting as a carrier for the finely divided reaction mixture. A catalyst is also present in the enclosure in order to promote the reactions of this invention. The elastic fluid may serve as a source of heat for effecting the reaction. In any event, the temperatures in the reaction enclosure are desirably maintained in the range from about 180° to 425° C. Under these conditions, the reaction goes to completion within a short time, down to a few seconds, and can readily be effected in a continuous manner.

The sulfur-containing organic compounds suitable for use in the process of this invention are those which contain a thio sulfur atom which is directly linked to a hydrocarbon radical of the aliphatic type, said radical having at least three directly interconnected carbon atoms, and the sulfur atom being linked directly to a methylene group which forms a portion of said radical, thus:

$$—CH_2—S—$$

Secondary or tertiary mercaptans may also be treated according to the process of this invention, but the yields of carboxylic acids are much lower than when primary mercaptans are used. Examples of suitable compounds are: aliphatic mercaptans, such as propyl mercaptan, 3-methylbutyl mercaptan, heptyl mercaptan, 2-propylhexyl mercaptan, undecyl mercaptan, dodecyl mercaptan, heneicosyl mercaptan, unsaturated mercaptans, such as undecylenyl mercaptan, and oleyl mercaptan, and dimercaptans, as well as the corresponding thioethers, such as heptyl thioether. Other suitable compounds for use in the process of this invention are derivatives of the foregoing organic compounds, which derivatives may contain, as substituents, straight chain, cyclic, or heterocyclic radicals, additional mercapto groups, and/or alkoxy, halogen, amino, or nitro groups, and the like. If unsaturated sulfur compounds are used as starting materials, the resulting carboxylic acids are also unsaturated. If more than one mercapto group is present in the starting compound, polycarboxylic acids are produced.

The strong base which is used for the fusion reaction may suitably be selected from the group consisting of alkali, alkaline earth, and quaternary ammonium oxides, hydroxides, and carbonates. Other strong bases, or compounds which decompose under the reaction conditions to yield strong bases, may be used for the fusion reaction. Normally, it is preferred to use an alkali metal hydroxide as the strong base.

Various procedures may be used for the preparation of the reaction charge. One procedure involves premixing the reactants, in cases where both reactants are solids, e. g., in Werner-Pfleiderer jacketed mixers or in a jacketed dough mixer. On account of hygroscopicity, the mixture of reactants may contain up to about 5% by weight of moisture; this moisture content does not interfere with the reaction. This mixture, if not in finely divided form, is pulverized to obtain the proper particle size for the reaction. The maximum satisfactory particle size has been found to be about 10 microns, and a suitable lower limit is about 0.5 micron. A preferred range for the size of the particles is 2–8 microns. The grinding of the reaction charge may be effected in the apparatus of Figure 1, dry-compressed air being injected into the apparatus at a temperature of about 100° F. during the grinding operation. The charge may also be ground by mechanical means, such as a high-speed hammer mill.

It will be understood that the ingredients of the foregoing pre-mixed reaction charges can also be introduced separately, in finely divided form, into the reaction enclosure. This also holds true where one or more of the reactants is introduced in liquid state, being normally liquid at room temperature, or being heated to a sufficiently high temperature to become molten before being introduced into the reactor. In the case of liquid reactants, it is extremely desirable that they be introduced into the reaction zone via nozzles which break the liquid up into a fine mist. Where both reactants are liquid, they can be introduced into the reaction enclosure separately, or they can be pre-mixed before such introduction. In the case of one solid and one liquid reactant, it is usually simpler to introduce these reactants into the reaction zone separately.

The oxidative alkaline fusion reaction involves the reaction of, in the case of mono-valent bases, one mole of the organic compound with two moles of the base. However, it is desirable to use excess strong base in order to promote the reaction. The base is advantageously used in an amount which is about 1.4 to about 20 or more times the stoichiometric amount of base required theoretically for the fusion reaction.

It is desirable to introduce steam and/or inert gases into the reactor to serve as a carrier for the reaction mixture. The steam or inert gases can be introduced into the reactor through nozzles, the heated elastic fluid (steam or heated inert gases) acting to keep the reaction mixture in suspension and to carry it through and out of the reaction zone in a rapid manner. The heated elastic fluid may also serve as a source of heat for the reaction. Alternatively, the heat may be supplied by other means, such as dielectric heating. In any case, an elastic fluid should be present in the reactor in order to act as a supporting means and carrier for the reaction mixture.

The velocity with which the steam and/or inert gas is injected into the reaction chamber across the path of the solid or liquid reactants determines, at least partially, the conditions of turbulence in the chamber and the speed with which the reaction can be brought to completion. While supersonic velocities can be used, they are not essential to the instant invention.

The catalysts required for the reactions of this invention are suitably selected from the group consisting of metals and metal compounds of group VI and group VIII metals of the periodic table. The heavy metal element may be present in the anionic radical of a salt of, e. g., oxy-acids of heavy metals of groups IV, V, and VI of the periodic table. Suitable compounds of these heavy metals include, for example, sulfides, oxides, tellurides, selenides, phosphides, and salts, especially of oxyacids of the heavy metals, such as chromates, tungstates, vanadates, molybdates, etc. The amount of catalyst used may range from about 2% to 30% or more, based on the weight of the alkali. The catalyst may suitably be introduced in finely divided form into the reaction enclosure, either separately or after being mixed with one or more of the solid reactants. This catalyst may be recovered from the reaction products, and be re-used. Alternatively, the walls of the enclosure may be coated with the catalyst, and/or massive pieces of the catalyst may be mounted in the enclosure in the path of the reaction mixture.

Among the carboxylic acids which may be produced from mercaptans by this reaction are: butyric acid, valeric acid, trimethyl acetic acid, caproic acid, heptanoic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; dicarboxylic acids, such as adipic acid and tetradecanedioic acid; and unsaturated acids, such as 4-tetradecenoic acid and oleic acid.

SUITABLE REACTORS

The apparatus used to effect the process of the invention may be of widely different types. No more apparatus than a large enclosure, into which the reactants can be projected, is required. It is preferred to utilize copper-lined equipment for the instant process.

The process may be carried out, e. g., in the apparatus of Figure 1, which is a schematic diagram of a commercial grinding apparatus which can be desirably utilized in the process of this invention. In Figure 1, the direction of flow of reactants and products is indicated by arrows. The reaction occurs primarily in an elongated vertical leg 10, which may suitably be from 2 to 8 inches in diameter, depending on the amount of production required per unit of time. The reactants, when solid, are charged to hopper 13, if desired via a controlled screw feed (not shown). Such reactants drop from hopper 13 into inlet pipe 11, and are then charged into the reactor by means of an elastic fluid, such as superheated steam. The elastic fluid is introduced into the upper end of inlet pipe 11 by means of a suitable injector. The pipe 11 is provided with a Venturi 12. The passage of the elastic fluid through Venturi 12 creates a partial vacuum on the reactor side of said Venturi, and this effect aids in the introduction of the feed stock into the reactor. The screw feed and hopper 13 are suitably sealed off from the atmosphere. If desired, for example, when one of the reactants is a liquid, there may be more than one inlet pipe 11. When the mixture of reactants is liquid, the screw feed can be replaced by a metering device for introducing the reactants at a desired rate.

The heated elastic fluid, which is preferably superheated steam and/or an inert gas, may be charged through pipe 14 into manifold 15. From the manifold, the heated elastic fluid passes through nozzles indicated at 16, and impinges, in the form of jets, on the reactants charged through pipe 11; the action of the jets of heated elastic fluid directs the reactants up leg 10, creates conditions of turbulence which promote the desired reaction, and the heated fluid serves as a source of heat for the reaction. As stated above, external sources of heat may be applied to leg 10, if it is not desired to supply all of the heat for the reaction by means of the heated elastic fluid. A pipe 17 provides entry into leg 10 for liquids, such as water, which may be injected for purposes of temperature control.

The apparatus is arranged to provide a cycle, including a return leg 18. Near the top of leg 18, a series of baffles may be mounted as indicated at outlet 19. Practically all of the reaction mixture passes out of leg 18 through the outlet 19, and then on to cooling and collecting equipment, indicated diagammatically at 20. In one embodiment of the invention, the leg 18 may be blocked off below the outlet 19 as indicated at dotted line 22, so that the entire reaction mixture leaves the apparatus in one pass through the reaction zone via outlet 19.

A small fraction of the reaction mixture, i. e., the coarser portion thereof, drops down leg 18, and is recycled through the reaction zone when leg 18 is not blocked off at 22. The amount of material recycled in this manner can be sharply reduced by eliminating the baffles at outlet 19. If desired, the material passing through the outlet 19 may be recycled, for further reaction, through another reactor similar to that shown in Figure 1.

The process can be carried out in other equipment. A simpler alternative apparatus is shown in Figure 2 which diagrammatically depicts a straight upright tube 18' for feeding solids or liquids or both, associated with a side tube feed 14' for feeding superheated steam. The lower end of tube 18' is connected by a U-coupling to upright reaction tube 10; the top of which is provided with a connection 21' for discharge of reaction products to cooling and collecting equipment. This apparatus is similar in operation to that of Figure 1, when the return leg 18 is blocked off at 22. The feed through pipe 11' into tube 18' can be identical to that through pipe 11, a screw type of feed device being depicted diagrammatically. In Figure 2, the introduction of the heated elastic fluid is shown to take place through pipe 14' and nozzles indicated by dotted lines at 16', the pipe being attached near the bottom of leg 18', instead of as indicated in Figure 1. The exact location of this pipe attachment is not crucial, so long as the jets of heated elastic fluid impinge on the reactant particles in such a manner as to sweep the latter around and up the reaction leg 10'. In fact, heated elastic fluid may be introduced at more than one location along the path of travel of the mixture of reactants. As described before in connection with Figure 1, water or other liquid may be injected for temperature control purposes through pipe 17'. After passing through reaction zone 10', the reaction mixture proceeds, at 21', to cooling and collecting equipment, or may be recycled through a similar reactor.

Other apparatus may also be used in the process of this invention. One of these is the vortex chamber described in U. S. Patent 2,441,613, where non-oxidizing combustion gases may act as the heat source and source of motion of the fine particles of the reaction mixture.

The time of reaction can be varied by (1) changes in size of the apparatus, (2) use of reactors in series, and (3) re-cycling in a given unit by controlled screening at the discharge port.

*Examples*

*Example 1.*—Oxidation of dodecyl mercaptan. This run was made in copper-lined apparatus corresponding to that of Figure 2, the legs 10' and 18' having a 4-inch diameter. The compound to be oxidized (dodecyl mercaptan) and the alkali (sodium hydroxide) were introduced separately; the mercaptan was warmed slightly and charged as a fine mist, while the sodium hydroxide was charged at a particle size of 2 microns. This run was continued for 4 hrs., the feed rates for dodecyl mercaptan and NaOH being 8 lbs. per hr. and 42 lbs. per hr., respectively; this amounted to 13.3 times the theoretical alkali requirement. In addition to these reactants, a catalyst, finely-ground nickel-tungsten sulfide (3.5 microns), was also charged to the reactor, being premixed with the NaOH; this catalyst was charged at the rate of 2 lbs. per hr. The reaction temperature was maintained at 250° C. Superheated steam was charged through nozzles 16' at a rate of 9 lbs. per lb. of feed stock, this steam being a source of heat for the reaction. The pressure in this and the following examples was atmospheric or slightly above atmospheric (up to about 5 p. s. i.). The yield of the reaction product, sodium laurate, amounted to 80% of theoretical. The product was acidified with a strong mineral acid for recovery of lauric acid therefrom in known manner.

*Example 2.*—Oxidation of oleyl mercaptan. This run was made in copper-lined apparatus corresponding to that of Figure 1, the legs 10 and 18 having a 4-inch diameter. As in Example 1, the compound being oxidized (oleyl mercaptan) and the alkali (potassium hydroxide) were introduced separately, the former as a fine spray and the latter in finely divided form (2.3 microns). This run was continued for 3 hours, the feed rates for the mercaptan and alkali being 7.5 lbs. per hr., respectively; this amounted to 1.4 times the theoretical alkali requirement. In this run, the walls of the reaction zone (leg 10) were coated with a catalyst, tungsten-cobalt sulfide. The reaction temperature was maintained at 425° C., partly by means of heated nitrogen charged through nozzles 16 at a rate of 8 lbs. per lb. of feed stock, and partly by means of external electric heaters mounted on leg 10. The yield of the reaction product, potassium oleate, was 78% of theoretical. Oleic acid was recovered therefrom by acidification with hydrochloric acid.

*Example 3.*—Oxidation of undecylenyl mercaptan. This run was made in stainless steel apparatus corresponding to that of Figure 2, the legs 10' and 18' having a 4-inch diameter. The mercaptan and alkali (lithium hydroxide) were introduced separately into the reactor as a fine spray and in finely-divided form (3.8 microns), respectively. This run was continued for 3.5 hrs., the feed rates for undecylenyl mercaptan and lithium hydroxide being 9 lbs. per hr. and 17.4 lbs. per hr., respectively; this amounted to 7.5 times the theoretical alkali requirement. In this run, the catalyst (chromium-iron oxide) was used in the form of lumps, which were contained in four elongated, vertical pockets formed by stainless steel screening. These pockets were formed against the wall of the leg 10', and were substantially the same length as that leg. The raction temperature was maintained at 295° C. The heat was supplied by external electrical heaters on leg 10', and by superheated steam charged through nozzles 16' at a rate of 10 lbs. per lb. of feed stock. The yield of lithium undecylenate was 85% of theoretical.

*Example 4.*—Oxidation of heptyl mercaptan. This run was effected in the apparatus used for Example 1. The heptyl mercaptan (as a fine spray) and sodium hydroxide (1.8 microns) were charged separately to the reactor at the rates of 8 lbs. per hr. and 102 lbs. per hr., respectively; this amounted to 21 times the theoretical alkali requirement. A catalyst, finely divided molybdenum sulfide (4.5 microns), was also charged to the reactor, being pre-mixed with NaOH, at the rate of 10 lbs. per hr. The reaction temperature for this run was 225° C. Superheated steam was the source of heat for the reaction, being charged through nozzles 16 at a rate of 9 lbs. per lb. of feed stock. The yield of sodium heptanoate amounted to 83% of theoretical.

*Example 5.*—Oxidation of heptyl thioether. This run was effected in the apparatus used for Example 1. The heptyl thioether (as a fine spray) and sodium hydroxide (2.3 microns) were charged separately to the reactor at the rates of 7 lbs. per hr. and 72.8 lbs. per hr., respectively; this amounted to 15 times the theoretical alkali requirement. The catalyst was finely-divided molybdenum-nickel sulfide (5.8 microns) and was pre-mixed with the NaAH, being charged to the reactor at the rate of 5.5 lbs. per hr. The reaction temperature for this run was 275° C. External electric heaters on leg 10 and heated nitrogen, charged through nozzles 16 at the rate of 8 lbs. per lb. of feed stock, were the sources of heat for the reaction. The yield of sodium heptanoate was 81% of theoretical.

*Example 6.*—Oxidation of 3-methylbutyl mercaptan. This run was made in copper-lined apparatus corresponding to that of Figure 1, the legs 10 and 18 having a 5-inch diameter, and the leg 18 being blocked off at 22. Ground sodium hydroxide (7.8 microns) was charged through screw feed 13 at the rate of 30.7 lbs. per hr. At the same time, 3-methylbutyl mercaptain was sprayed into the mill above the manifold at pipe 17 at the rate of 10 lbs. per hr. The amount of sodium hydroxide used amounted to 4 times the theoretical alakli requirement. The catalyst, finely-divided lead molybdate (6.4 microns), was pre-mixed with the sodium hydroxide, and was charged at the rate of 3 lbs. per hr. This run was continued for 3 hrs. at a reaction temperature of 235° C. Heated nitrogen was charged through nozzles 16 at a rate of 8 lbs. per lb. of feed stock, and this source of heat was supplemented by external electric heaters on leg 10. The yield of the reaction product, sodium 3-methylbutyrate, amounted to 84.5% of theoretical.

ADVANTAGES OF PROCESS

In the prior art processes, the mechanical mixing of the reactants during the course of the reaction caused many complications. There is no such problem in the instant process, since the desired intimate mixing of the reactants is readily effected as a result of the turbulence set up by the introduction of jets of elastic fluid into the reactor. The present process proceeds smoothly at atmospheric or subatmospheric pressures. In the instant process, an extremely rapid completion of the reaction occurs in a continuous manner and with the greatest simplicity. A further advantage of the present process is the high yields of desired products. Also, the operation of this process in the presence of steam or an inert gas serves to form products of higher quality than previously attainable.

Obviously, many modifications and variations of the invention, as hereinbefore set forth, will be apparent to those skilled in the art and are within the spirit of the appended claims.

What is claimed is:

1. A continuous process for the oxidative alkaline fusion of an organic compound containing a thio sulfur atom which is directly linked to a hydrocarbon radical of the aliphatic type, said compound being selected from the class consisting of organic monosulfides and mercaptans, which comprises: (*a*) charging said compound and an effective amount of a strong base, both of these compounds being in finely-divided form the particle size of said compounds, when charged as solids, not exceeding about 10 microns, into an enclosure containing a catalyst selected from the group consisting of metals and metal compounds of group VI and group VIII metals of the periodic table and mixtures thereof; (*b*) introducing an elastic fluid selected from the class consisting of steam and inert gases substantially simultaneously into said enclosure to convey said charged compounds and the reaction products thereof through said enclosure; (*c*) heating the contents of said enclosure to an elevated temperature from about 180° to 425° C.

2. The process of claim 1, in which said hydrocarbon radical, contained in said organic compound, has at least three directly interconnected carbon atoms, and said sulfur atom is linked directly to a methylene group which forms a portion of said hydrocarbon radical.

3. The process of claim 1, in which said organic compound is a mercaptan.

4. The process of claim 1, in which said organic compound is heptyl mercaptan.

5. The process of claim 1, in which said organic compound is undecylenyl mercaptan.

6. The process of claim 1, in which said organic compound is oleyl mercaptan.

7. The process of claim 1, in which said organic compound is heptyl thioether.

References Cited in the file of this patent

UNITED STATES PATENTS

| | | |
|---|---|---|
| 2,407,044 | Tyrer | Sept. 3, 1946 |
| 2,572,238 | Ballard et al. | Oct. 23, 1951 |
| 2,580,931 | Lane | Jan. 1, 1952 |

FOREIGN PATENTS

| | | |
|---|---|---|
| 672,512 | Great Britain | May 21, 1952 |
| 479,146 | Belgium | Aug. 4, 1950 |